Patented Nov. 27, 1934

1,982,280

UNITED STATES PATENT OFFICE 1,982,280

COATING COMPOSITION

William W. Bell, Englewood, N. J., assignor to Celluloid Corporation, a corporation of New Jersey No Drawing. Application June 6, 1931, Serial No. 542,685

4 Claims. (Cl. 134—79)

This invention relates to the production of coating compositions, and particularly lacquers containing derivatives of cellulose.

An object of my invention is to provide such a lacquer suitable for application to metal, wood or other surfaces, and having a pearly or nacreous appearance and capable of withstanding outside exposure.

A further object of this invention is to provide such a lacquer which upon drying yields a film that is tough, hard, resistant, adherent and water repellant.

The preparation of surfaces on metal and wood and the like which would have a pearly lustre has been the object of much experimentation. However, these efforts have met with little or no success and as a result such surface could be obtained only in plastic sheets or masses. While various fish scale substitutes have been put out on the market, these materials did not retain or impart their pearly or nacreous effect when incorporated in a lacquer. Also they lacked sufficient durability when exposed to outside elements, a defect which has been another cause of failure of such automotive lacquer finishes.

I have now found that lacquers containing derivatives of cellulose may be prepared in such a manner that they not only will possess nacreous effects, but will retain such effects when applied to surfaces which are to be coated. If silky precipitated mercurous chloride or fish scale or similar nacreous substances are incorporated with pigments and other desired ingredients in such lacquers, the lacquer will possess nacreous effects and the film remaining upon evaporation of the solvent will also retain this highly desirable silvery sheen or pearly lustre.

By combining a pigment with the nacreous substance the pearly appearance is not lost but is preserved and accentuated, and the result is a new decorative effect combining a surface sheen and a deepening and softening of the color of the pigment. Neither effect is reduced or diluted, and both the coloring and the pearliness are improved by the combination.

The mixture of nacreous substance and pigment is also combined in the cellulose composition with a resin which aids in imparting the desired qualities to the final coating and in maintaining the decorative effect produced by the inter-mixture of the pigment and the nacreous substance. Therefore, in accordance with my invention the lacquer is prepared containing one or more derivatives of cellulose, one or more natural, semi-synthetic or synthetic resins and the nacreous substance and pigment together with fluid media comprising one or more softening agents or plastifiers, low boiling solvents, medium and/or high boiling solvents and diluents.

The coating resulting from such a lacquer not only has the new decorative appearance above noted, but is durable, adherent and weatherproof to a high degree, and particularly adapted to withstand outside exposure.

Further objects and advantages will appear from the following detailed description of the ingredients and their application to form the final coating:

The cellulose derivatives may be inorganic esters of cellulose such as cellulose nitrate and pyroxylin or they may be organic esters of cellulose such as cellulose acetate, cellulose propionate, cellulose butyrate or ethers of cellulose such as ethyl cellulose, methyl cellulose, benzyl celluose, and the like.

Examples of resins which I have found suitable for incorporation in the lacquer are ester gum, dewaxed dammar gum, dewaxed or bleached shellac, Kauri and Pontianac of the natural or semi-synthetic resins and synthetic resins such of those of the phenolformaldehyde type, the glyceryl phthalate type and vinyl type. The synthetic resins are recommended for use when the lacquer is to be exposed outdoors while the natural resins or ester gum are advantageous for indoor uses.

The following plasticizers are given as examples of the type which have been found suitable. The phosphoric acid esters of aromatic compounds such as triphenyl phosphate and tricresyl phosphate, dibutyl tartrate, diethyl phthalate, dibutyl phthalate, alkyl toluene and benzene sulfonamids and triacetin. Vegetable oils such as castor oil, linseed oil, China wood oil, etc., may also be employed as softening agents or plasticizer diluents. When vegetable oils are used they should not be present in amounts greater than the amount of active plasticizer present. The particular plastifier or plastifiers used will depend somewhat on the cellulose derivative or derivatives forming the base of the lacquer and also upon the particular resin or resins present.

The solvents employed will depend to some degree upon the purpose to which the lacquer is to be put. If a quick drying lacquer is desired the proportion of high boilers will be lower than where a high drying lacquer is desired. Also the particular cellulose derivative and resin present will determine the type of solvents employed. In any event the proportions of low, medium and high boilers should be so adjusted that an evenly evaporating solvent will result. As examples of low boilers, the following are given: 2B alcohol, ethyl acetate. Suitable medium boilers are: butyl acetate, butyl alcohol and ethylene glycol monoethyl ether, while amyl acetate, ethylene glycol monobutyl ether and ethyl lactate are examples of high boilers. Diluents such as benzol, toluol and xylol may also be added to the lacquer.

The pigments which may be incorporated in the lacquer may be any of those which are employed in the paint and lacquer industry, for example zinc oxide, lithophone, titanium oxide, white titanium pigment, burnt umber, chrome yellow, chrome green, milori blue, ultramarine, and carbon black. Soluble dyes may also be added.

In addition to the pigments above enumerated I add to the lacquer the special substances which form the basis of this invention. To obtain the pearly lustre and peculiar brilliancy which is so highly desirable I incorporate nacreous material in the lacquer. Fish scale, silky precipitated mercurous chloride, specialy prepared lead iodide, oxanilide, crystalline bismuth subnitrate, bismuth oxychloride, barium hyposulphite and lead paroxybenzoate are examples of this class of substances.

A silky silvery variety of mercurous chloride may be prepared in the form of a non-aqueous pearl essence by adding to a solution of mercuric chloride in hydrochloric acid a solution of stannic chloride in the same acid. The resultant precipitate is then washed with water until all impurities are removed and the water remaining is then removed by washing with a water miscible solvent such as alcohol. To the water free precipitate are then added suitable organic solvents having plastic substances such as nitrocellulose or cellulose acetate dissolved therein. If desired the mercurous chloride may be retained in aqueous suspension instead of removing the water and adding organic solvents containing a plastic dissolved therein and an essence containing the same may be prepared in the usual manner. The lustrous or silky lead iodide has also been found suitable for use in accordance with the present invention. This particular form of lead iodide is prepared by dissolving 1 part of lead iodide ($PbI_2$) in about 500 parts of boiling water, adding to this solution 10 parts of a 1% aqueous solution of gum acacia and then suddenly cooling the solution with vigorous agitation. Fine silky crystals of lead iodide separate out and are removed and, if necessary, freed from water by washing with alcohol and the like. The lead iodide may then be dispersed in other organic liquids or solvents for pyroxylin, cellulose acetate or cellulose esters, which dispersion may be used for preparing the essence in the usual manner.

The preparation of fish scale essence is well known and need not be described here. In like manner the preparation of essences containing bismuth and barium and other nacreous salts are well known and need not be detailed here.

My lacquer can be applied in several different ways, the method of application varying with the effect desired. It may be applied by spraying or brushing or in any other manner. As an automotive finish, or one exposed to climatic conditions, lacquers prepared in accordance with this invention are unequalled, not only in appearance but also in durability. This increased durability of pigmented lacquers containing the nacreous substances is probably due to the fact that the shiny particles of the nacreous substance cause a reflection of the light rather than an absorption, with the consequence that the pigmented nacreous lacquer is much more durable than a pigmented lacquer which does not contain the light reflecting particles. When used for such purposes the nacreous substance, such as the silvery mercurous chloride, is incorporated in a pigmented lacquer and the lacquer applied in the usual manner. The effects obtained are unusual. The finish has a brilliant lustre, extremely high mirror-like reflection, marked extension of "high lights" giving a soft silvery hue resembling the appearance of so-called hard enameling glazing with a definite increased depth of finish as compared with the usual pigmented lacquers. By suitable selection of pigment a lustrous gunmetal sheen which is highly pleasing to the eye may be obtained.

Another advantage arising from the use of nacreous substances in automotive lacquers or outside finishes in accordance with my invention is the fact that slight differences in shade between various parts of the body are not perceptible. The nacreous lacquer is consequently quite valuable in touching up spots where such slight differences in color exist.

The technique of applying the nacreous lacquers prepared in accordance with this invention does not differ materially from the ordinary methods employed in applying lacquers. However the use of such lacquers makes it possible to obtain unique appearances by devising and utilizing ingenious means of ornamenting the nacreous lacquers. As is to be expected, it is somewhat difficult to obtain light reflections on flat surfaces. This is possible only by special modes of application whereby the nacreous layers are made irregular, or by resorting to an actual hill and dale surface to carry the scale layer which is subsequently levelled by further lacquer coating. However, many brilliant finishes have been obtained by spraying various coats through screens or stencils, moving the same between each application of scale.

In general my nacreous pigment lacquers may be applied by dipping, brushing, spraying or by coating machines or transfer rolls or in any other suitable manner. When the dipping method is employed care should be taken to incorporate the nacreous substance in the proper lacquers and agitate this thoroughly and frequently.

The incorporation of these nacreous substances is best effected by first preparing an essence containing the particular nacreous substances to be used. This essence is then introduced into the main body of the lacquer and uniformly distributed therein. The proportion of essence added to the lacquer will of course vary with the particular nacreous substance used, the effect desired, the composition of the lacquer to which it is to be added and in some instances also upon the manner in which the finished lacquer is to be applied. For ordinary uses ½ to 3 or more pounds of the essence to a gallon of pigmented lacquer give excellent results.

For the convenience of the consumers the various nacreous substances are supplied in many different forms, such as suspensions in water, glycerine, alcohol, toluol, butyl acetate, ethylene glycol monoethyl ether, etc. A 25% nacreous substance content can easily be made with these menstrua. The most convenient form however is a pyroxylin or cellulose acetate essence. The pyroxylin essence found highly suitable consists of a nitrocellulose preparation made up as follows:

|   | Percent by weight |
|---|---|
| Nacreous substance (dry basis) | 12½ |
| Nitrocellulose (30 seconds) | 12½ |
| Alcohol | 12½ |
| Butyl acetate | 62½ |

The cellulose acetate essence can be made up in a similar manner employing suitable solvents such as acetone or diacetone alcohol and the like. These essences can be easily mixed or dispersed in any lacquer or dope.

The following are a few examples illustrating some of the typical formulæ of my improved lacquers.

*Example I*

| | |
|---|---|
| Pyroxylin (½ second) | 100 parts |
| Plasticizers | 25 to 60 parts |
| Resin | 25 to 60 parts |
| Zinc oxide | 100 parts |
| Solvents | Q. S. |
| Silky mercurous chloride essence | ½ to 3 lbs. per gallon of lacquer |

*Example II*

| | |
|---|---|
| Cellulose acetate (2 seconds) | 100 parts |
| Plasticizers | 25 to 60 parts |
| Resin | 25 to 60 parts |
| Chrome green | 100 parts |
| Fish scale essence | ½ to 3 lbs. per gallon of lacquer |
| Solvents | Q. S. |

*Example III*

| | |
|---|---|
| Pyroxylin (½ second) | 100 parts |
| Plasticizers | 45 parts |
| Resin | 25 to 60 parts |
| Milori blue | 150 parts |
| Bismuth oxy chloride essence | ½ to 3 lbs. per gallon of lacquer |

*Example IV*

| Solids per gallon | | Fluid media per gallon | |
|---|---|---|---|
| Pyroxylin (½ second) | 20 ounces | Toluol | 35% |
| Pyroxylin (90 seconds) | 5 ounces | Benzol | 35% |
| Ester gum | 12 ounces | Hexalin | 7½% |
| Dammar gum | 12 ounces | Ethyl acetate | 12½% |
| Zinc oxide | 32 ounces | Butyl acetate | 10% |
| Tricresyl phosphate composition | 6 ounces | | |
| Silky mercurous chloride | 1 lb. | | |

*Example V*

| Solids per gallon | | Fluid media per gallon | |
|---|---|---|---|
| Pyroxylin (½ second) | 8 ounces | Toluol | 35% |
| Pyroxylin (20 seconds) | 4 ounces | Benzol | 30% |
| Pyroxylin (90 seconds) | 4 ounces | Amyl acetate | 5% |
| Ester gum | 28 ounces | Ethyl acetate | 20% |
| Zinc oxide | 40 ounces | Butyl acetate | 5% |
| Castor oil | 3 ounces | Denatured alcohol | 5% |
| Silky mercurous chloride | 1 lb. | | |

It is to be understood that the above examples are merely illustrative and not limitative. The several formulæ above set out can and will be varied dependent upon the manner of application, the particular use to which the lacquer is to be put, fluctuations in the costs of the various solvents, essences and other ingredients, the effects desired and other conditions met with. These variations are to be considered within the scope of the present invention.

I claim:

1. A coating composition comprising a cellulose derivative, a resinous substance, a plastifier, and solid opaque pigment particles mixed with nacreous material and distributed throughout said composition in relative proportions of not over fifty percent of nacreous material in proportion to the pigment and acting to impart to the coating a deep soft color in direct combination with a surface sheen of permanently pearly lustre.

2. A coating composition comprising a cellulose derivative, a resinous substance, a plastifier, and solvents in sufficient proportion to adapt the composition for brushing, spraying or the like and solid opaque pigment particles mixed with nacreous material and distributed throughout said composition in relative proportions of not over fifty percent of nacreous material in proportion to the pigment and acting to impart to the coating resulting from the application of said composition a deep soft color in direct combination with a surface sheen of permanently pearly lustre.

3. A coating composition comprising a cellulose derivative, a resinous substance, a plastifier, and solvents in sufficient proportion to adapt the composition for brushing, spraying or the like and solid opaque pigment particles mixed with precipitated nacreous crystals and distributed throughout said composition in relative proportions of not over fifty percent of nacreous material in proportion to the pigment and acting to impart to the coating resulting from the application of said composition a deep soft color in direct combination with a surface sheen of permanently pearly lustre.

4. A coating composition comprising a cellulose derivative, a resinous substance, a plastifier, and solvents in sufficient proportion to adapt the composition for brushing, spraying or the like and solid opaque pigment particles mixed with precipitated nacreous crystals of mercurous chloride and distributed throughout said composition in relative proportions of not over fifty percent of nacreous material in proportion to the pigment and acting to impart to the coating resulting from the application of said composition a deep soft color in direct combination with a surface sheen of permanently pearly lustre.

WILLIAM W. BELL.